United States Patent [19]

Klosel

[11] Patent Number: 5,702,994
[45] Date of Patent: Dec. 30, 1997

[54] MOLDABLE FILM FOR FASTENING TO A BASE AND SHIELDING FROM RADIATION OR FOR INSULATION OF ELECTRICALLY CONDUCTING PARTS

[75] Inventor: Egon Klosel, Walldorf, Germany

[73] Assignee: Besma Beschichtungsmassen GmbH, Heidelberg, Germany

[21] Appl. No.: 218,691

[22] Filed: Mar. 28, 1994

Related U.S. Application Data

[63] Continuation-in-part of Ser. No. 956,175, Oct. 5, 1992, abandoned.

[30] Foreign Application Priority Data

Oct. 5, 1991 [DE] Germany ............... 41 33 122.2
Mar. 23, 1994 [DE] Germany ............... 44 10 558.4

[51] Int. Cl.$^6$ .................................................. C09J 7/02
[52] U.S. Cl. .......................... 442/229; 428/344; 428/354
[58] Field of Search .................... 428/40, 354, 261, 428/344

[56] References Cited

U.S. PATENT DOCUMENTS

| | | | |
|---|---|---|---|
| 4,525,398 | 6/1985 | Rooklyn | 428/40 |
| 4,749,612 | 6/1988 | Borkowski | 428/40 |
| 4,804,568 | 2/1989 | Ohsawa | 428/40 |
| 4,981,544 | 1/1991 | Nordale | 428/40 |
| 5,206,070 | 4/1993 | Haibach | 428/354 |

FOREIGN PATENT DOCUMENTS

| | | |
|---|---|---|
| 1985131 | 3/1963 | Germany. |
| 3444533 | 6/1986 | Germany. |
| 3815749 | 3/1988 | Germany. |
| 1186568 | 8/1986 | Japan ............... 428/40 |

*Primary Examiner*—Jenna Davis
*Attorney, Agent, or Firm*—Fisher, Christen & Sabol

[57] ABSTRACT

A a fastening device and/or shielding or insulating device in the form of a film 1 for parts, especially components, pipes or electric lines on a surface. The film 1 has at least two layers, which on one side exhibit at least two adhesive surfaces 5 placed at a distance to one another. In this way, the fastening device 1 or a thus designed adhesive strip can be used as the cable conduit 12.

7 Claims, 9 Drawing Sheets

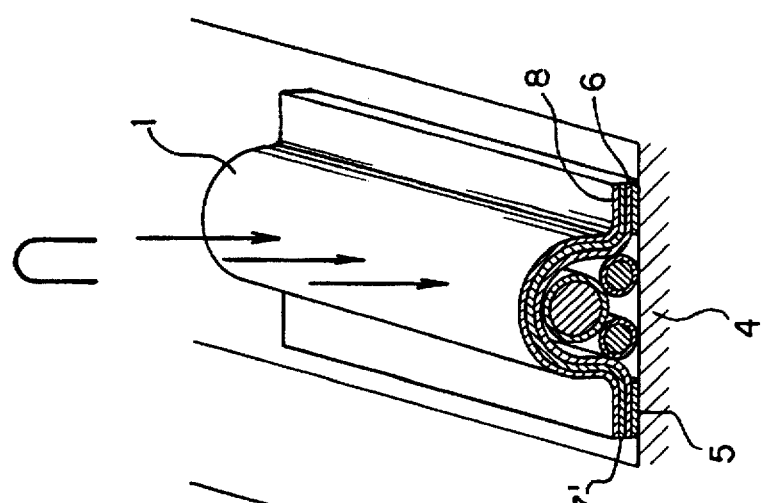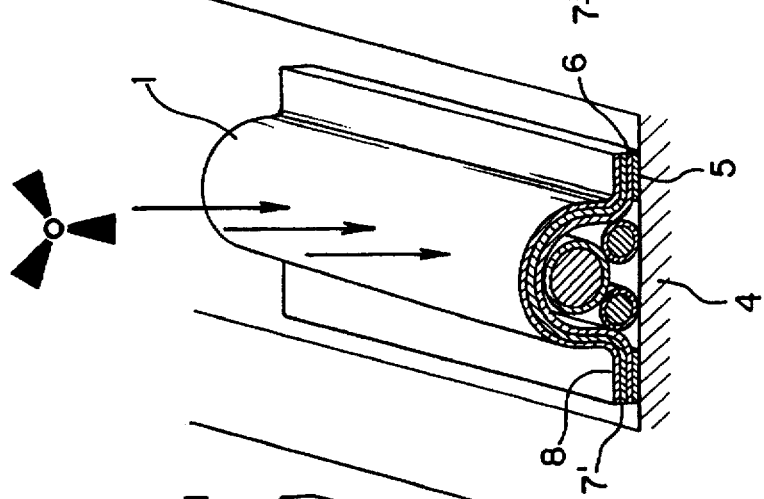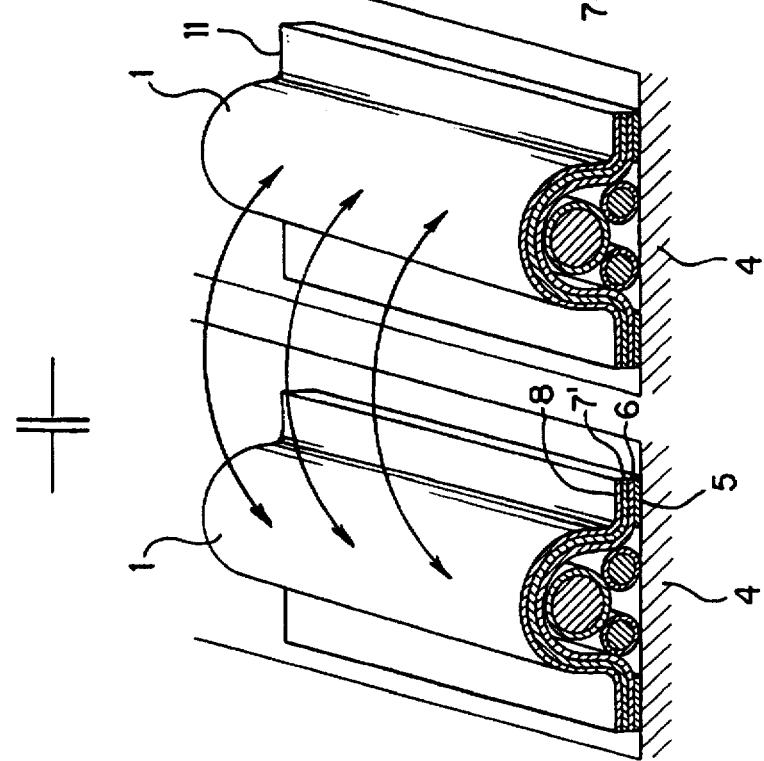

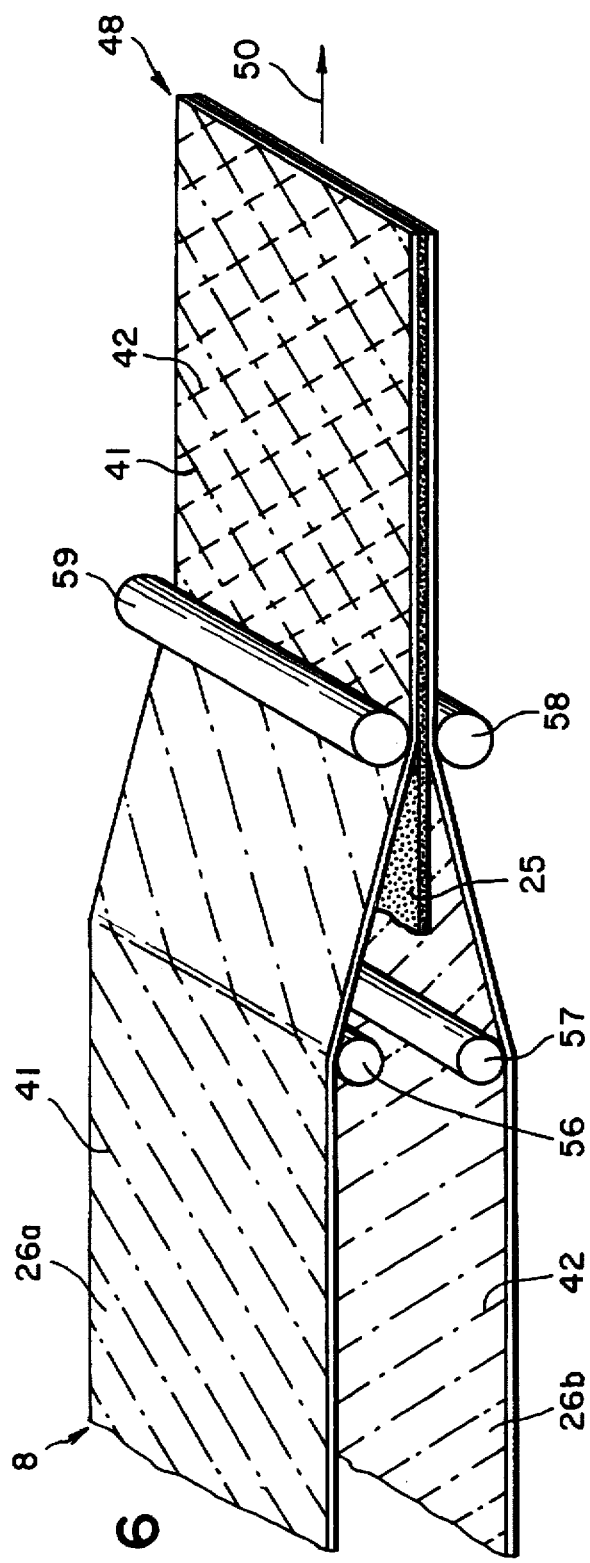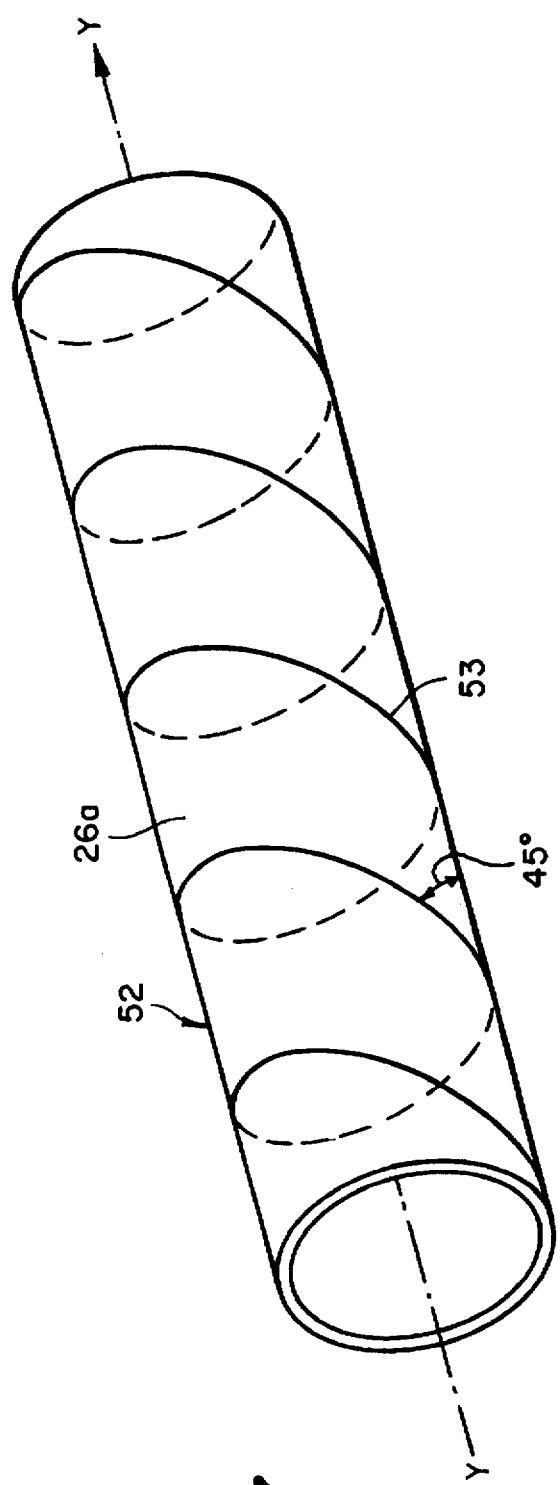
FIG. 6
FIG. 7

MOLDABLE FILM FOR FASTENING TO A BASE AND SHIELDING FROM RADIATION OR FOR INSULATION OF ELECTRICALLY CONDUCTING PARTS

This application is a Continuation-in-part of prior U.S. application Ser. No. 07/956,175, filed Oct. 5, 1992, now abandoned.

BACKGROUND OF THE INVENTION

1. Field of the Invention

The invention relates to a moldable film for shielding from radiation, flows, electric fields and/or for insulation or for galvanic separation of electrically conducting or conductive parts and/or for fastening parts, especially components, pipes or electric lines to a base, with at least one side of the film being provided with an adhesive surface for fastening to the base.

2. Prior Art

In general, polymer materials or polymer fabrics and also strips produced from aluminum, which are provided with an adhesive surface on the underside and are used to cover areas to be protected, are already known. It is also known to use these adhesive strips to protect lines or as fastening elements. But these adhesive strips have the drawback that they leave behind impurities on the surfaces of the cable lines or on the ground, if they are to be pulled off some day from the cable lines. Aluminum strips provided with adhesive surfaces, which can be used for shielding, can be processed only poorly since they exhibit no mechanical strength and easily corrode after a while. Further, German Patent No. 3,815,749 A1 discloses a plastic fastening element, which has a head and a shaft that can be inserted in a borehole, which is provided on the outside with a rib arrangement like a dowel. On the head of the dowel, a loop provided as a cable conduit is placed in which numerous cables can be placed next to one another. But such a fastening device is very expensive and can be mounted only by damaging the ground.

Further, a holding element for fastening lines to a base, which is used in particular in hot plates of a surface heating unit and which is used to accommodate pipelines, is known from German Patent No. 3,444,533 A1. The hoop is made from a clamp with two legs running horizontally, on whose underside an adhesive surface each for fastening to a base is provided. But such a fastening element or a pipe clamp is complex and expensive and is used only to fasten pipelines. For this purpose, numerous clamps are fastened at a distance to one another on the base. But it is not usable as a continuous or integral fastening element for long pipelines. Further, for each diameter, a correspondingly sized clamp has to be used so that the warehousing costs thus are relatively high.

BROAD DESCRIPTION OF THE INVENTION

The main object of the invention is to provide a soft, easily moldable film that can be matched to different conditions, which can be used as a fastening device and/or also a shielding device and/or an insulating device. Other objects and advantages of the invention are set out herein or are obvious herefrom to one skilled in the art.

The main object of the invention is achieved in that the film is composed of at least two layers made as a composite, which exhibit a different material composition. At least one layer has shielding or insulating properties and at least one other layer on the entire surface has an adhesive surface or adhesive layer that is continuous (or discontinuous) or has interruptions. As a result, a very economical, easily moldable fastening device, shielding device and/or insulating device is obtained in the form of a film, which because of its good deformability can easily be matched to each part to be fastened or to each diameter of a pipeline. In this connection, it is advantageous that the adhesive surfaces have interruptions at some points so that in this nonadhesive part of the film the parts to be fastened in a certain area can be mounted to slide lengthwise, if this is desired.

For this purpose, it is advantageous that on the underside of one layer of the film, at least two adhesive surfaces placed at a distance to one another are provided, and the layers permanently connected to one another are designed as cross or as lengthwise lamination. If such films produced as composites are designed in a crosswise lamination, a very high strength for the highest of stresses is obtained.

The adhesive surfaces on the film according to the invention placed at a distance to one another are suitable especially for conduits or cable conduits, which are to be applied to the surface of a component, or a bottom or a wall. The distances between the individual adhesive surfaces can be different, and are thus variable and can be applied or glued to the surface of the ground, specifically in a way that (which is suitable to accommodate cables or electric lines) between the adhesive points in the tack-free area of the film, a curvature or a free space is provided which then can be easily fastened by edge gluing to the surface of the bottom. By the free space between the adhesive surfaces, the lines can be moved in lengthwise direction inside of the cable conduit.

In another embodiment of the invention it is advantageous that, on the underside of one layer of the film, at least two adhesive surfaces which run parallel to each other, which are placed at a distance to one another and which extend over the entire length of the film, are provided.

Further, it is advantageous that on the underside of one layer of the film, an adhesive layer that can be applied residue-free to a surface of a part to be fastened is provided, that the adhesive material of the adhesive strip consists of a material mixture and that the structure of the layer is pretreated by corona discharge for adhesion of the adhesive to the layer of the film.

By the advantageous selection of the adhesive applied to the film, the film with the adhesive can easily again be removed from the surface of the bottom if, for example, the cable is newly laid.

Also, it is advantageous that at least one layer of the film is made from a plastic, especially from a polymer material or from a polymer fabric, that the moldable and/or elastically designed film can be fastened with its two adhesive strips to the surface of a stationary part or to the surface of the bottom and that the adhesive strips are arranged at a distance to one another so that the middle part or the part lying between the adhesive strips forms a receiving space that can be changed in height and/or width for receiving pipes, cables or other components.

It is also advantageous that one or more layers of the film is a composite laminate, especially of a polyethylene composite laminate, polyethylene composite laminate fabric or of a polyolefin material.

In another embodiment of the invention, it is advantageous that the layers of the film be made of a composite laminate having different strength.

It is considered especially advantageous that the film be made of three layers, where at least two of the layers between themselves or to the third layer exhibit a different strength and that the film is made of three layers, where at least two of the layers consist of polyethylene or other polyolefine and the third layer of a low-plastic or plastic-free material.

It is further advantageous that at least one layer or the third layer for shielding or for hindering the propagation of the action of radiation, electric fields and/or flows consists of a metal material. Since the fastening device or the fastening device designed as the film is made of plastic, which is composed of two or several (more) layers, it can be exposed to a very high tensile force without having to be afraid of the film tearing. This is guaranteed, i.a., also by the cross lamination.

But it is also possible to reduce the tensile or tear strength of the film if this is desirable for certain uses especially when the film is to be used as a short-term fastening element and is to be fastened only for a short time to the bottom, e.g., in cable-laying in television stations. To provide for a quick laying and fastening of the cable, it is then desirable to configure the tear strength of the film so that it can be torn off from a roll without a cutting tool. For this purpose, it is advantageous that the layers of the film connected with one another are made in the lengthwise laminate.

In another embodiment of the invention, it is advantageous that at least one layer or the third layer for shielding or for hindering of the propagation of the action of radiation, fields and/or flows or for the galvanic separation of electrically conducting or conductive parts is composed of least partially of a glass, polyacrylate, polyethylene or paraffin material and/or corresponding fabric.

To hinder the propagation of the action of radiation, fields or flows, different materials, advantageously glass, polyacrylate, polyethylene, paraffin or metal materials, can be used. Metals, especially aluminum, aluminum fabric, lead or lead fabric or other materials can be placed between two layers for shielding from secondary radiation or secondary effects (ionization, x-ray radiation, $\alpha$-, $\beta$- or $\Omega$-radiation).

The film according to the invention can thus be used alternatively as a fastening device and as a shielding device or simultaneously for both fields of use. If the film is placed as a fastening device for a cable, the two external adhesive surfaces are pressed on both sides of the cable to the bottom and thus are fastened in a simple way so that the cable is attached in the cable conduit formed as a result. Depending on the size of the free space, the cable can also be moved within the curvature formed by the film and then the cable is only laterally attached to the bottom. In this way, the cable can easily be tightened inside of the fastening device, if this is necessary.

By using two or more layers which are produced as composite material, the strength of the film is increased. Further, the shielding material can be introduced in a simple way between the two external layers. For this purpose, it is advantageous that the third layer, especially the layer containing metal, be embedded between the two external plastic layers.

It is also advantageous for the third layer to consist of a metal fabric, especially of a copper fabric.

If the film is to be used as a fastening and shielding device, it is advantageous that the lowermost and/or the topmost layer have two or more adhesive strips placed at a distance to one another, that the individual distances be the same or of different size and that the receiving space of electric lines be designed or moldable as a component conduit, especially as a cable conduit.

It is also advantageous that, in the area of the receiving space or cable conduit, a third adhesive strip is provided which can be connected with a component provided in the receiving space.

It is further advantageous that the adhesive strip have a width between 5 and 50 mm and that the adhesive material of the adhesive strip consists of a material mixture, which comprises acrylic adhesive portions, with the solvent components being under 1 percent.

Further, it is advantageous that the adhesive material of the adhesive strip be UV-resistant.

It is further advantageous that the composite material or the two outer layers of the film consist of polyolefin material and be made electrically conductive as well as connectable with a second metal layer.

In another embodiment of the invention, it is advantageous that the film or the composite material have a thickness of up to 200μ and that the composite material or the film is designed as a multilayer film with more than three layers, and between each two plastic layers, another conducting layer is provided, whose thickness is the same as or smaller than the thickness of the composite material.

According to a further development of the film according to the invention, the film is provided on one or both sides with a lamination of paper and/or fabric with at least one of the outer layer of the film being provided with a perforation.

It is further advantageous that a layer of metal and the second and/or third layer of polyester, polyethylene or polyolefin be applied in the cross laminate or lengthwise laminate to the adjacent layer, that the layers have flame-retardant additives and that at least one layer or the polyethylene material has a thickness of between 0.035 mm and 0.5 mm, especially a thickness between 0.08 mm and 0.15 mm.

By the advantageous grounding of the conduit film, leakage flows can be discharged in a simple way. This can be achieved by grounding the composite film. In an advantageous way, the metal base of the composite can be used as a conductor for leakage flows or as a pulse transmitter. Also, such films for lining pipes having a large cross section.

Further, it is possible to produce films formed as a triple composite without adhesive to be used both as corrosion protection as well as a shielding device against static charging of switchgear or for shielding entire spaces. For this purpose, it is advantageous if the middle layer is made as a copper lattice or another metal lattice.

To improve the shielding properties, it is advantageous if the middle metal film has a thickness between 100 to 200μ, preferably 200μ. If, for example, the film is designed as a multilayer film and another conducting layer is provided between the individual plastic layers, as a result the conductivity and the shielding properties of the entire film can be significantly improved.

By the advantageously designed film and the described materials, the shielding against static, magnetic, electric or radio interferences as well as against microwaves, x-ray and gamma rays can be achieved in a simple and economical way.

By the use of polymeric substances, for example, polyolefins, the metal layer provided as an intermediate layer for shielding or as a conductor is preferably laminated by polyo-melt between the two spirally-stretched polyo-films. Other layers can be supplemented in a similar way to spirally-cut flat webs in the cross laminate as normal polyo-film or as metal foil.

The film 1 (see the drawings, for example) can consist of a multilayer system with the following layer structure. Below, four layer systems are described, which have turned out to be especially advantageous, namely:

1. a spiral film with a thickness between 35μ and 60μ,
2. a melt with a thickness between 10μ and 15μ,
3. a spiral film with a thickness between 35μ and 60μ,
4. an adhesive with a thickness between 25 and 50 gr/m².

It is further advantageous for the film to consist of a multilayer system with the following layer structure:

1. a spiral film with a thickness between 35μ and 60μ,
2. a melt with a thickness between 10μ and 15μ or an adhesive with a thickness between 25 and 50 gr/m²,
3. a metal foil with a thickness between 7μ and 200μ,
4. a melt with a thickness between 10μ and 15μ,
5. a spiral film with a thickness between 35μ and 60μ,
6. an adhesive with a thickness between 25 and 50 gr/m².

It is also advantageous for the film to consist of a multilayer system with the following layer structure:

1. a cross laminate with a thickness between 80μ and 130μ, the cross laminate consisting of two polyolefin material laminates, which are connected with one another by a melt,
2. a melt with a thickness between 10μ and 15μ,
3. a metal foil or metal foil fabric with a thickness between 7μ and 200μ,
4. a melt with a thickness between 10μ and 15μ,
5. a spiral film, which consists of a polyolefin material with a thickness between 35μ and 60μ,
6. a melt with a thickness between 10μ and 15μ or adhesive with a thickness between 25 and 50 gr/m².

Further, it is advantageous for the film to consist of a multilayer system with the following layer structure:

1. an adhesive with a thickness between 25 and 50 gr/m²,
2. a cross laminate with a thickness between 80μ and 130μ,
3. a melt with a thickness between 10μ and 15μ,
4. a metal foil or metal foil fabric with a thickness between 7μ and 200μ,
5. a melt with a thickness between 10μ and 15μ,
6. a polyolefin material with a thickness between 10μ and 15μ.

It has turned out as especially advantageous for the material mixture to consist of an acrylic material with a solvent content under 1 percent or an acrylic dispersion, and the weight per unit area being between 20 and 70 gr/m² or between 25 and 50 gr/m², preferably 30 gr/m².

The invention very preferably is a moldable film (1) comprising or consisting of several layers (5, 6, 7', 8, 5, 6, 7, 26, 32) for shielding from radiation, flows and/or electric fields and/or for insulation or for galvanic separation of electrically conducting or conductive parts and/or for fastening parts, especially components, pipes or electric lines to a base. An outer or upper layer (7, 8, 26a, 32a) is drawn crosswise to the longitudinal side or to the longitudinal middle axis of the film (1). At least one more layer (6, 26b, 32b), which is directly bonded to the first one, is drawn in the opposite direction, likewise with respect to the longitudinal middle axis of the film (1), in such a way that the drawing orientation lines (41, 42) or the resulting oriented molecular structure of the layers intersect at an angle and that one of the two layers is bonded by means of an adhesive (21, 31, 5) applied either over the entire surface or else in strips, and one of the layers (6, 26b, 32b) is directly or indirectly bonded by means of a polyethylene (PE) melt (25) to a metal layer (7'). Preferably in the fastening device, a first or upper layer (8, 26a), which is drawn in a direction crosswise to the longitudinal side of the film (1), is bonded by means of a PE melt (25) to the second layer (26b), which is drawn in the opposite direction with respect to the first layer (26a), and the second layer (26b) is directly or indirectly bonded by means of a polyethylene melt (33) to a metal layer (7, 24) on whose underside a polyethylene melt (23) is applied, which has the adhesive (5) applied over the entire surface or in strips. Preferably, in the fastening device, the metal layer (7) is positioned between two layers (32a, 32b), which are drawn in opposite directions, and the metal layer (7) is bonded on both sides by means of the polyethylene (35) to the layers, whereby one of the layers (32b) has the adhesive (31). Preferably, in the fastening device, the metal layer (24) is positioned after two layers (26a, 26b), which are drawn in opposite directions, and the metal layer (24) is bonded to the upper layers (26b) by means of the polyethylene melt (33) and bonded by means of another polyethylene melt (35) to two more layers (26a, 26b), which are drawn in opposite directions, whereby the one outer layer (26b) has the adhesive (21).

The invention very preferably is a moldable film (1) comprising or consisting of several layers (5, 6, 7', 8, 5, 6, 7, 26, 32) for shielding from radiation, flows and/or electric fields and/or for insulation or for galvanic separation of electrically conducting or conductive parts and/or for fastening parts, especially components, pipes or electric lines to a base. An outer or upper layer (7, 8, 26a, 32a) is bonded to at least one more layer (6, 26b, 32b), whereby one of the two layers is bonded by means of an adhesive (21, 31, 5) applied either over the entire surface or else in strips, and one of the layers (6, 26b, 32b) is bonded by means of a polyethylene melt (25) directly or indirectly to a metal layer (7'). Preferably, in the moldable film (1), a hollow rivet (17) made of metal can be inserted into the films (5, 6, 7') and the metal rivet (17) connects the metal layer (7') with an electric line (14).

Other advantages and details of the invention are listed in the claims and in the description and represented in the figures, and it is pointed out that all individual features and all combinations of individual features are essential to the invention.

BRIEF DESCRIPTION OF THE DRAWINGS

In the drawings, the invention is represented in an embodiment, for example, without being limited to this embodiment. In the drawings:

FIG. 2 is a second embodiment of a cable conduit with an adhesive strip formed from three layers;

FIG. 2b is a section representation of the hollow rivet according to FIG. 2a;

FIGS. 5a, 5b and 5c are perspective representation of different fastening devices as cable conduits for various functions;

FIG. 6 is a perspective representation of the individual layers of the fastening device before the joining;

FIG. 7 is a tubular film produced by means of extrusion from which a film sheet is cut out in a spiral shape, which was first drawn in the longitudinal direction of the tubular film;

DETAILED DESCRIPTION OF THE DRAWINGS

Figure 1:
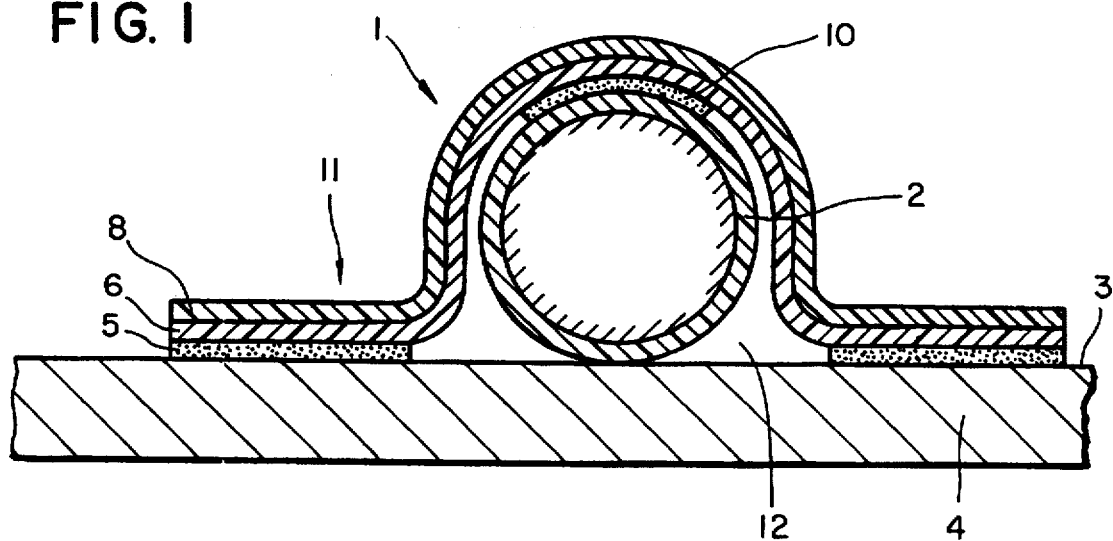
FIG. 1 is a section representation of a cable conduit with an adhesive strip designed as a fastening device.

The following is a list of reference symbols in the drawings:

1. fastening device, shielding/insulating device, film
2. line, cable, pipe
3. surface
4. stationary part, wall part, bottom, base
5. adhesive strip, adhesive surface, adhesive layer
6.7 ' metal layer
7. layer
8. layer
10. third adhesive strip, adhesive layer
11. composite material or multilayer film strip, laminate
12. cable conduit, receiving space
13. penetration
14. conductive cable
15. ground
17. reinforcement element, eyelet, headless pin, hollow rivet
18. closing element
19. pulse generator
20. power supply
21 adhesive
22 sealing crown
23 PE melt
24 metal foil
25 PE melt
26a, b layer, drawn crosswise (film sheet)
27 rivet head
28 cutting edge, wavy
29 radius
30 rivet shaft
31 adhesive
32 composite film
33 PE melt
34 metal film
35 PE melt
36 paper layer
37 adhesive
41 drawing orientation line
42 drawing orientation line
46 composite film, two crosswise drawn films/layers
47 metal foil with PE melt
48 composite film, two crosswise drawn films
50 arrow
52 film tube
53 spiral line
54 arrow
56 roller
57 roller
58 roller
59 roller
66 composite film In FIGS. 1 through 13 in the drawings, numeral 1 shows a moldable or elastic film for shielding from radiation, flows and/or electric fields and/or for insulation or for galvanic separation of electrically conducting or conductive parts and/or for fastening parts, especially components, pipes or electric lines 2 to a base 4, whereby at least one side of the film 1 is provided with the adhesive surface 5 so that it can be fastened to the base 4.

In the drawings, a moldable or elastic film for shielding from radiation, flows and/or electric fields and/or for insulation or for galvanic separation of electrically conducting or conductive parts and/or for fastening parts, especially the components, pipes or electric lines 2 to the base 4, is designated by the numeral 1. At least one side of the film 1 for fastening to the base 4 is provided with the adhesive surface 5. The film 1 can also be used as a fastening device and simultaneously or also separately as a shielding or insulating device. The part 4 indicated in FIGS. 1 and 2 can be part of a floor, a glass surface or a building beam, on whose surface a component, a cable or the electric line 2 can be attached by the fastening device or film 1 or else can be fastened permanently.

Figure 2A:
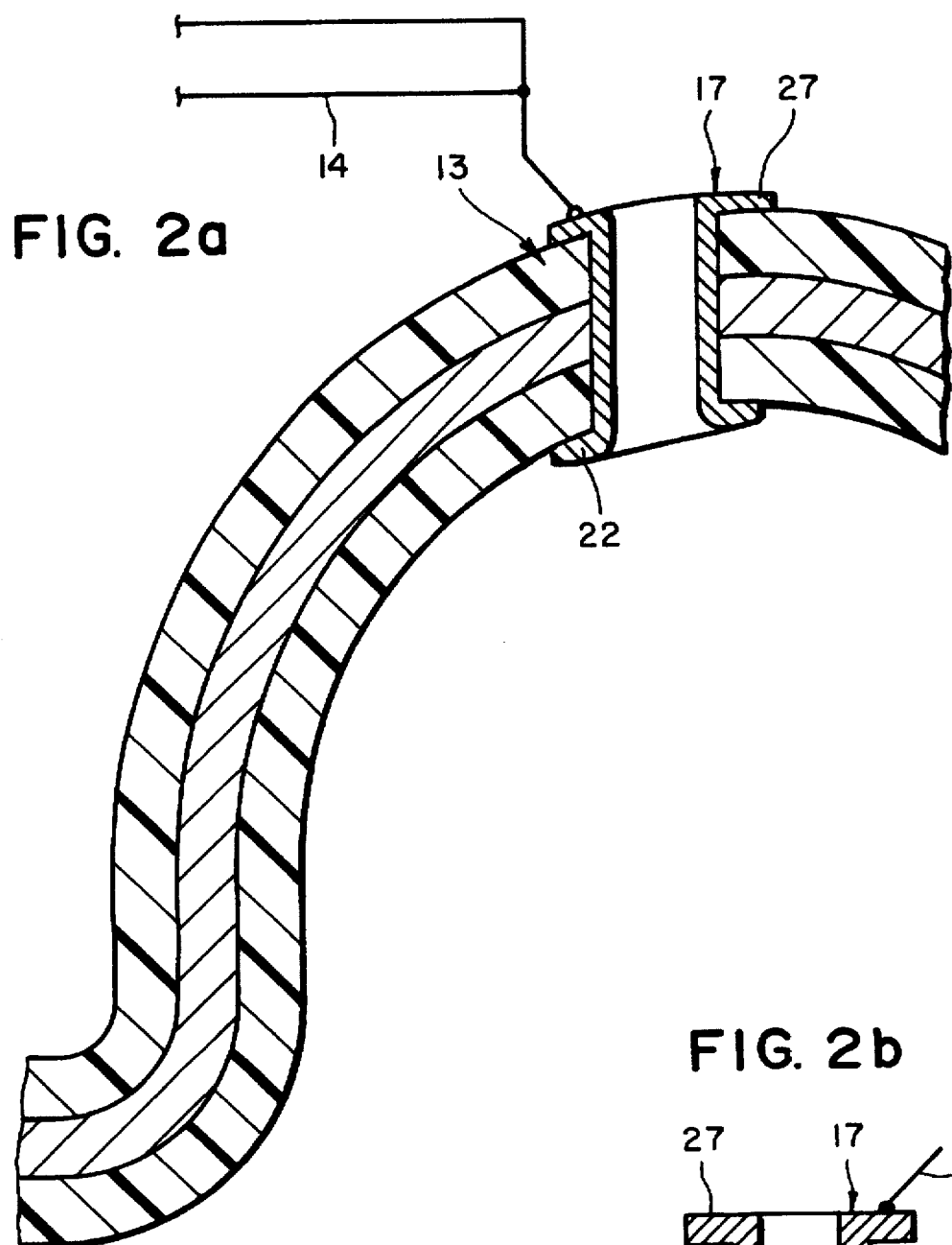
FIG. 2a is a section representation of a hollow rivet for the connection of an electrical line.
Figure 2B:
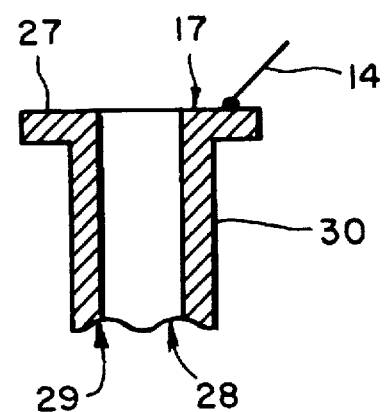
Figure 3:
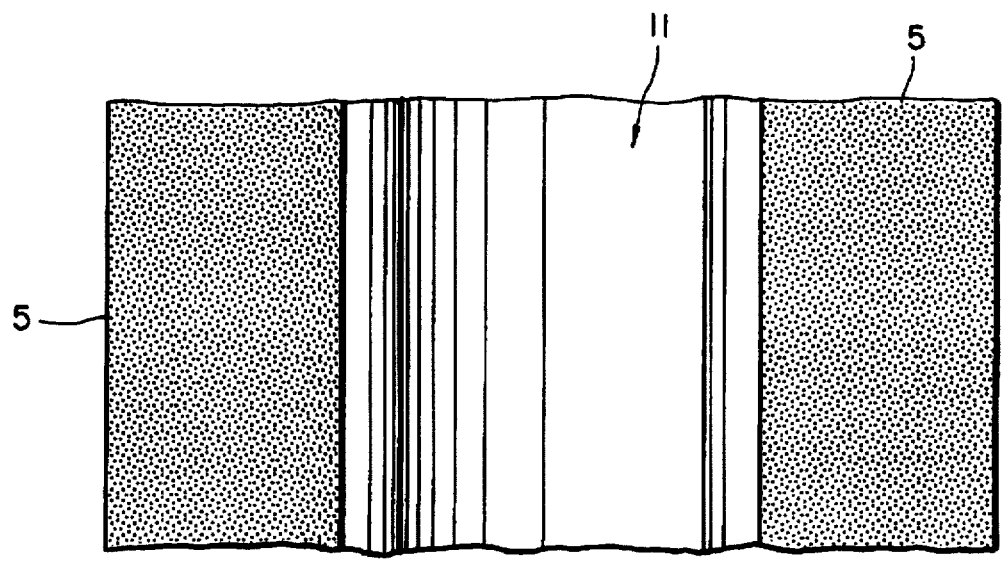
FIG. 3 is a top view according to FIG. 1 with the two external adhesive strips.

The film 1 represented in FIGS. 1 to 3 is composed of the moldable, soft, high-strength composite material 11 with at least one continuous adhesive surface or two or more adhesive surfaces, which are placed next to one another, run parallel to one another and extend over the entire length of the film 1 (see FIG. 5a). Such film 1 is designed as an endless film strip and can be wound on a wound core.

According to another embodiment, the adhesive layer 5 advantageously consists of a UV-resistant material, which further has the property that it can again be drawn off from the surface residue-free together with its carrier composite. Since no residues remain, after the removal of the film 1, which was applied by this adhesive to the surface of the bottom 4, no subsequent treatment of the bottom 4 needs to take place.

According to FIG. 1, the fastening device 1 is composed of the multilayer laminate 11 or a film strip, which is produced as cross laminate. The laminates or individual layers 6, 8 can be equipped in one direction with a considerable tensile strength, e.g., in lengthwise direction to the film. With reference to the directional data, the individual layers can be aligned differently relative to the adjacent layer, i.e., are applied offset crosswise. A perspective representation of the individual layers of the fastening device before the joining together is represented in FIG. 6. Here the individual lines convey the alignment of the film or the lines of force or the direction with the greater tensile strength. Between the two layers 6 and 8, the melt or an adhesive can be introduced, which produces a permanent bond between the two layers 6 and 8.

The composite material 11, which (according to FIG. 1) is made of the two layers 6, 8, can consist (or be composed) of a polymer material, such as polyolefin material, especially polyethylene. Since the composite material 11 is made of the two layers 6, 8, a great resistance or tensile strength at a very high degree of deformation is obtained in lengthwise and crosswise direction. Such a composite material 11 can easily be made as a flexible, soft adhesive strip (FIG. 5), which can be wound on a core (not shown in the drawing).

Other advantages result if, according to another embodiment, the individual laminates or layers in lengthwise direction or in the same alignment are glued or otherwise connected with one another. Adhesive strips so produced can be torn laterally without great expenditure of force and thus can be separated in the required length without a cutting tool. By the tearing, the adhesive strip is only slightly stretched in the tearing direction.

As can be seen from FIG. 1, the fastening device or the film 1 can be molded and varied at will as the cable conduit 12. The height and width of the cable conduit 12 can be determined at will by slightly deformable film 1 and can also be changed after fastening to base 4 by detaching half of a strip. The shape of the cable conduit 12 is obtained advantageously in that the composite material or laminate 11 is provided with at least two adhesive strips 5, which are placed at a distance to one another and, depending on the type of stress, can be between 10 mm and 100 mm wide, especially 20 mm. The adhesive strips 5 are preferably provided in the edge area of the film 1 in lengthwise direction. Two adhesive strips 5 are applied to the surface 3 of the bottom 4 at a distance great enough that the semicircular cable conduit 12 is formed, in which various components are accommodated and can be attached to the surface 3 of the bottom 4. In the embodiment according to FIGS. 1 and 5b, the cable 2 is provided in the cable conduit 12.

The laminate or composite material 11 exhibits a third adhesive layer 10, which produces a permanent bond between the laminate 11 and the cable 2, so that the cable 2 is attached still better to the bottom 4 or cannot easily be pulled in lengthwise direction by the cable conduit 12, if that is not desired.

To further improve the strength in certain types of stress and to achieve complete shielding, the composite material can be produced from three or more layers. In the embodiment, according to FIG. 2, the composite material or laminate 11 consists of the three layers 6, 7', 8 which can exhibit varying strength and are made of a polyolefin/metal composite. In this case, the two outer layers 6, 8 are made of a plastic or of polyolefin or especially of polyethylene, and the middle layer 7' consists of another material, for example, of a metal fabric, a metal strip or a glass fabric.

Further, the third layer 7' may consists of Cu. In this connection, the penetration 13 can be provided in the outer layer 8 and 6 consisting of plastic or another insulating material, through which the conductive cable 14 is run, which connects the middle, Cu layer 7' or the copper strip with the ground 15. So that the external layers 6 and 8 are not torn in the area of the penetration 13, a reinforcement element or the eyelet 17 is inserted, through which the cable 14 is run. The eyelet 17 can also be inserted in a simple way in the layers 6, 7', 8 (FIG. 2). Further, the outer layer can be penetrated in a simple way and then the conductive or outer conductive part of the layer can be connected with the metal foil and the cable 14 is brought to the metal foil. The outer layer can advantageously be equipped with a graphite pigmentation.

According to another example, the small worm screw 17 may be pressed in the film, or a punch may be used to push through the upper film 8 so that an electrical connection to the middle layer 7' is produced. This has the advantage that the film 1 can be used not only for fastening components but also as a shielding device. The device is used in this case also to prevent mutual influencing of lines, assemblies, devices and units by electric or else magnetic fields. For this purpose, the layer 7' provided between the two outer layers 6, 8, which can consist preferably of Al or Cu or else of another suitable material and is connected electrically conducting with the ground, is advantageously provided. The shielding effect is based in this case on a charge displacement, by which the shell for the equipotential surface and thus the interior of the shell is field-free. In this way, the film 1 performs many functions; it is used for one thing to attach components and cables and can simultaneously also be used as a shielding or insulating device. The composite material 11 can also be used only as a shielding or insulating device and can be connected with the individual components.

Advantageously, the conducting layer 7', according to FIG. 2, lies between the two outer layers 6, 8 consisting of plastic. Depending on the use, also one of the outer layers 6, 8 can be conducting.

According to FIG. 1, the two layers 6, 8 are not conducting, although it can be advantageous that at least one of the layers 6 and 8 is conducting.

As can further be seen from FIG. 2, the cable 14 can be connected by the make contact 18 in addition to the pulse generator 19, which can be connected with the power supply 20. In this way, especially the multilayer composite material 11 according to the invention can be used for digital transmission of information and data, and the data is modulated in the pulse generator.

Further, it is possible that only one or two layers exhibit a varying strength. Further, the possibility exists that two layers consist of polyethylene and the third layer consists of a low-plastic or plastic-free material. Advantageously, the third layer 7 is embedded between the two external plastic layers 6 and 8 according to FIG. 2.

As can be seen from FIG. 1, the lower layer 6 exhibits the two or more adhesive strips 5, which are applied at a uniformly parallel distance to one another and extend in lengthwise direction of the film 1 (see also FIG. 5a).

The composite material 11 or the polyolefin material can exhibit a thickness between 0.035 mm and 0.5 mm, especially between 0.08 and 0.15 mm.

Figure 4:
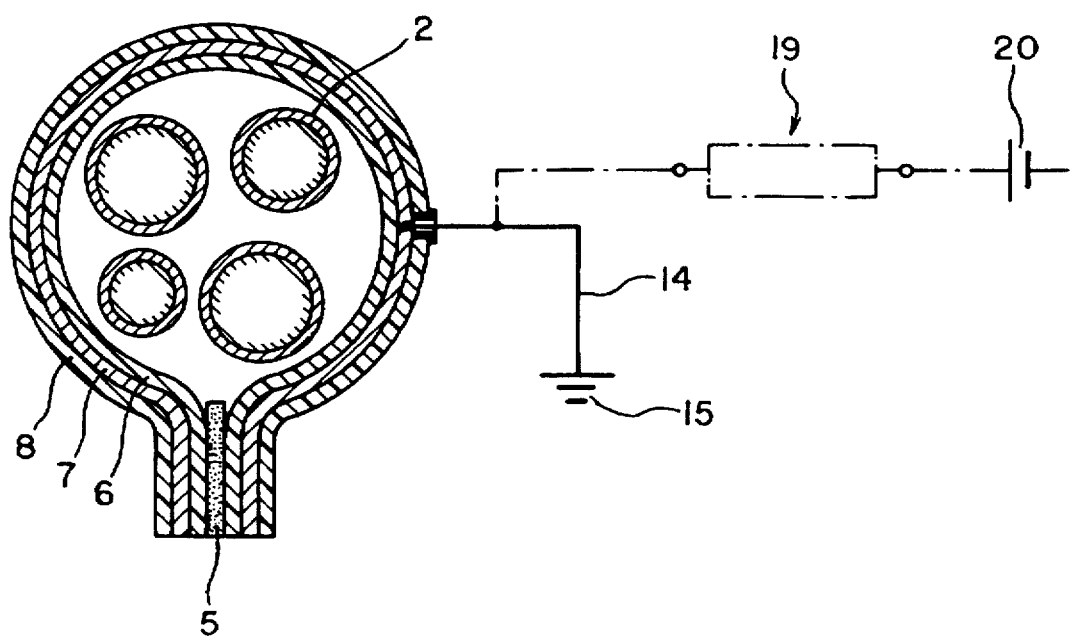
FIG. 4 is another embodiment of a fastening device with several cables or lines in cross section.

In FIG. 4, the three-layer composite 11 is represented. Between the two layers 6 and 8 consisting especially of polyolefin, the third layer 7 is embedded. The third layer 7 can consist of metal, especially of Al and/or Cu or of a metal fabric strip, e.g., copper fabric.

The film 1 (FIG. 4) is suitable as a shielding device for one or more electrically conducting cables 2, e.g., as a cable harness. It is as movable as the cable itself, therefore a laying even with very entwined cable guideways can be achieved in matching difficult space conditions.

For this purpose, the lower layer 6 can be provided on the inside with the continuous adhesive surface 5 or with two or more adhesive surfaces 5 exhibiting a uniform distance among one another, by which the lines 2 can be held together or else can be attached to the surface 3 of the component or bottom 4.

The production of the film 1 can take place in a different way. For example, a film of polyethylene material can first be produced, a metal or aluminum or copper foil or copper strip fabric can be applied in a second work step, and a liquid polymer material can be introduced as a binder between these two layers in the fusion-casting process. This polymer material exhibits different strengths so that the described tearing effect occurs if the film is to be cut through. The lateral tearing is facilitated if the entire film is provided at small intervals with lateral indentations or is ribbed. If the film is made as cross laminate, this advantage is eliminated, but such a film exhibits a very high resistance, especially a high tear and penetrating resistance.

Between the two layers 6 and 8, one or more narrow metal strips can be provided. The metal strip or metallic thread is extended over the entire length of the fastening device or film 1. The width of the metal strip can be significantly narrower than the width of the two layers 6 and 8.

The film 1 can be provided with a continuous adhesive surface or else with at least two adhesive strips running parallel to one another or else with numerous adhesive strips placed at a distance to one another, which extend over the entire length of the film and run parallel to one another. If, for example, more than two or three adhesive surfaces are provided on the underside of the film 1, several cable conduits 12 running parallel next to one another with only the single film 1 can be formed on the base or bottom 4.

The same film 1 can also be used as a shielding device if it or a layer of the film exhibits shielding properties. This layer can be provided as an intermediate layer between the outer and inner layers 6, 8 according to FIG. 2. In this use, it is also possible to provide the layer exhibiting shielding properties as an outer layer. In another variant, more than three layers can also be provided, and the layers are made alternately as shielding and as insulating layers.

A film thus designed can be attached in the vicinity of electric lines with low or high voltage by simple gluing over onto a permanent ground and in addition can be used as insulating material (FIG. 5c).

Further, the inner film or the metal foil between two layers can also be grounded by exposure to discharge overloads in this way. Also, it can be used as a voltage carrier for signal or leakage flows.

In FIG. 5, the symbol just below the legend FIG. 5(a) means electrical protection, the symbol just below the legend FIG. 5(b) means radioactive protection, and the symbol just below the legend FIG. 5(c) means magnetic protection.

In a multilayer structure, for example, the following layer variations are possible: in a 4-layer structure, the layers can consist of polymer, metal or glass fabric, again polymer and of an adhesive.

It is also possible to provide polymer, metal or glass fabric, polymer, metal or glass fabric, polymer and finally adhesive or other layers.

The individual layers can be connected to one another either in lengthwise or in crosswise connection. Depending on the structure of the individual layers, different shielding and insulating values are obtained. By means of such designed films, control stands, test stands and other electrical devices can be shielded later on in the simplest way, without having to perform structural changes.

By the lamination of the lead foil with polymers, an easily removable, easy-to-process film, which is tear- and break-resistant, is produced. Further, the release of harmful substances is rendered impossible.

Advantageously, the adhesive can be flame-retardant and self-extinguishing.

Further, it is possible to use alaolyolefin cross lamination and to laminate the intermediate layer, for example, the metal layer, by polyomelt between the two spirally-extended polymer films.

It is also possible to apply other layers in the described way as spiral film or as spirally-cut flat web or as complete cross laminate.

By special additions or additives, for example, metal additives, the polymers, especially the polyolefin films, can be made electrically conductive. Advantageously, different material films or composite films can be produced. The examples listed below can be varied at will.

1. Cross laminate, melt, metal, melt, polyfilm, adhesive.
2. Cross laminate, melt, metal, melt, polyfilm, without adhesive.
3. Spiral flat film, melt, metal, melt, spiral flat film, melt, with and without adhesive.
4. Spiral flat film, melt, metal, melt, cross laminate, melt, with or without adhesive.
5. A laminate or a film can be supplemented in addition by lamination with paper or jute/fabric on one or both outside surfaces and then can be bonded similar to wallpaper and can be used for full-surface shielding of spaces. In this case, the film is to be provided with a perforation, so that the walls can breathe. The film thus produced has considerable advantages relative to usual metal foils.

To achieve the described properties, it is advantageous to form a material film of at least two or more, advantageously of seven layers with the following thicknesses:

1. a spiral film of about 35μ to about 60μ,
2. a melt of about 10 to 15μ,
3. a spiral film of 35 to 60μ,
4. an adhesive film of 25 to 50 g/$f^2$ (FIG. 1) or cross laminate of 80 to 130μ,
5. a melt of 10 to 15μ,
6. a metal foil or fabric of 7 to 200μ,
7. a melt of 10 to 15μ (FIG. 3).

The moldable film schematically shown in FIG. 2 and made up of several layers 6, 7' and 8, for shielding from radiation, flows and/or electric fields and/or for insulation or for galvanic separation of electrically conducting or conductive parts and/or for fastening parts, especially components, to a base, is shown in detail in FIGS. 11, 12, 12b and 13.

Figure 11:
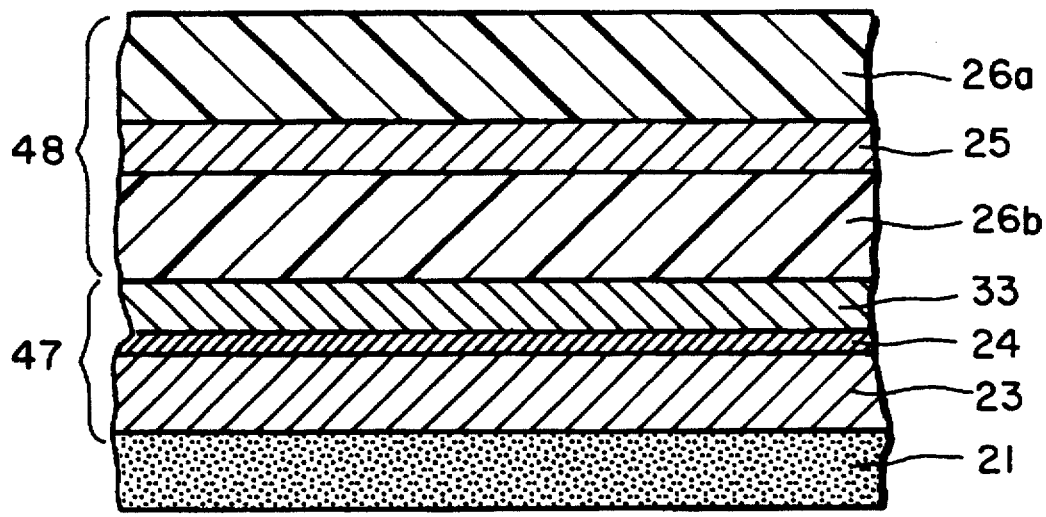
FIG. 11 is a section representation of a film sheet which comes from individual differently drawn layers or sheets and which are connected to each other by means of polyethylene binders, whereby at one place or between a certain layer, a metal foil has been inserted, whereas there is an adhesive on the surface of an outer layer, either over the entire surface or in strips.

The upper layer 8 shown in FIG. 2 is designed as a polyethylene layer and, according to FIG. 11, consists of two crosswise drawn layers 26a and 26b, which are bonded to each other by a polyethylene melt 25 in such a way that the two crosswise drawn films 26a and 26b can shift with respect to each other in a certain area, when the films change in length due to different thermal expansion or tensile stress. Thus, the polyethylene melt 25 forms a floating bond between the two layers 26a and 26b as well as with the other layers which are bonded to each other, as is explained below.

The drawn layer 26b (FIG. 11) is also bonded by means of another polyethylene melt 33 with the metal foil 24 designated with the numeral 7' in FIG. 2. On the underside of the metal foil 24, there is another polyethylene melt 23 which serves to receive the adhesive designated with the numeral 5 in FIG. 2 and with the numeral 21 in FIG. 11. The adhesive 5, 21 can be applied onto the underside of the polyethylene melt 23 either in strips or else over the entire surface. According to FIGS. 2 and 11, the adhesive 5, or adhesive 21 in FIG. 11, can be applied onto the polyethylene melt 23 in two adhesive strips arranged at a distance from each other.

During the production of the crosswise drawn films 26a and 26b (FIG. 7), a spiral-cut flat sheet is obtained which, according to FIG. 7, is spirally cut out of a film tube 52. Before the film tube 52 is cut out as a flat sheet, it is drawn in the longitudinal direction of the axis of the tubular film as shown by the arrow 54. As a result, the molecular structure of the film is oriented in a special manner, and when the individual molecule lines are connected, the result is a drawing orientation line 41 which intersects the longitudinal edge of the film 26a, according to FIG. 10, at an angle of 45°. Consequently, the drawing orientation line 41 of the upper layer 26a intersects the drawing orientation line 42 of the film 26b below it, according to FIG. 10, at an angle of 90°.

Figure 10:
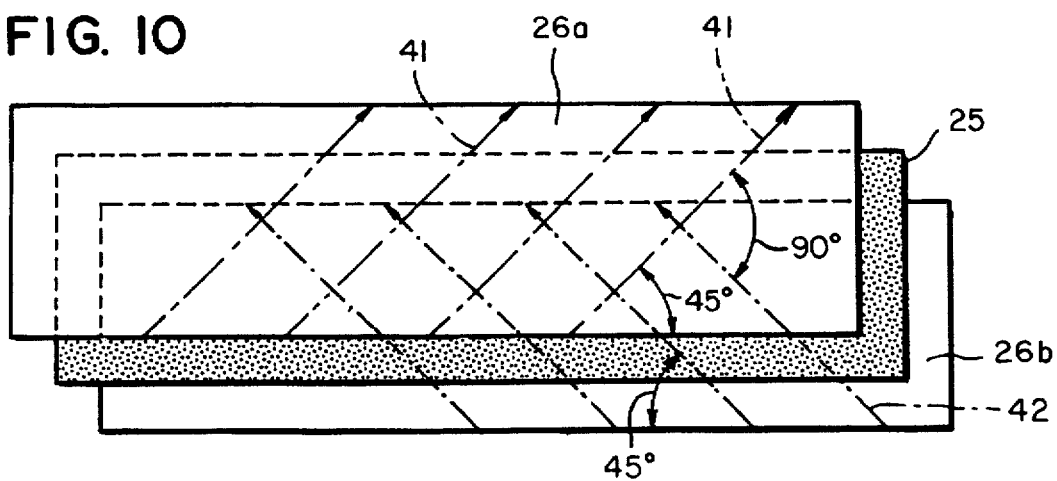
FIG. 10 shows two film sheets drawn in opposite directions with respect to each other and the polyethylene binder which lies between them, in a perspective representation.
Figure 12:
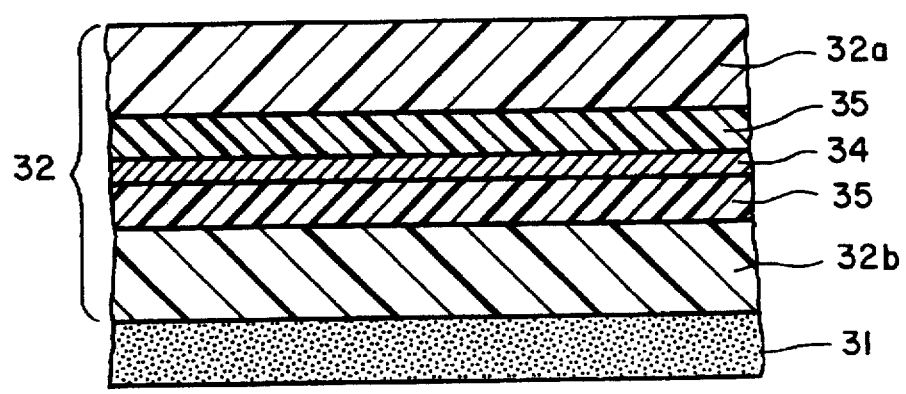
FIG. 12 is a further section representation of a film sheet which comes from individual differently drawn layers or sheets and which are connected to each other by means of polyethylene binders, whereby at one place or between a certain layer, a metal foil has been inserted, whereas there is an adhesive on the surface of an outer layer, either over the entire surface or in strips.
Figure 12A:
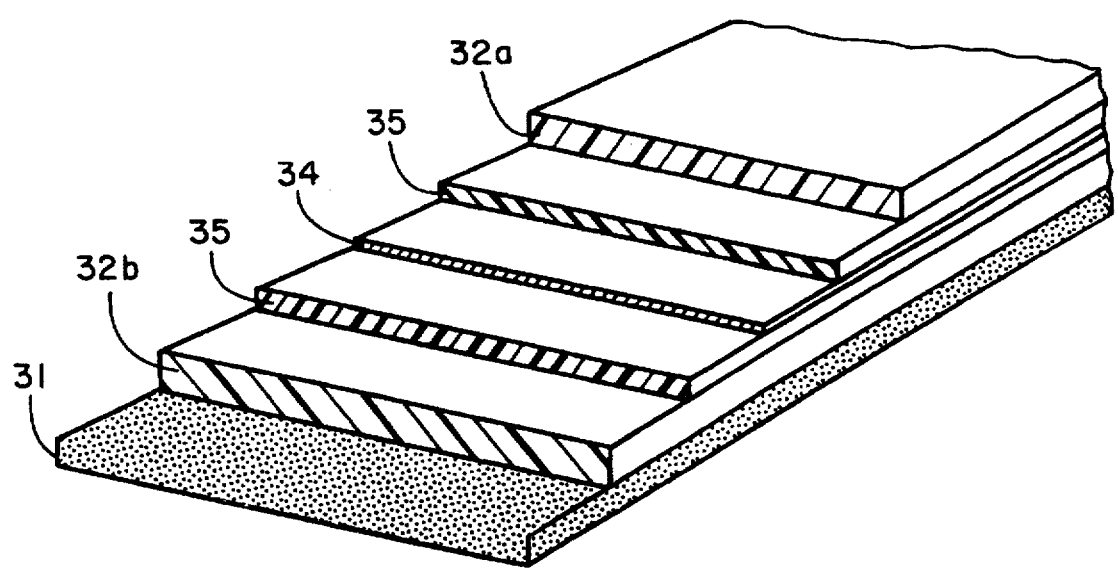
FIG. 12a is a perspective representation of the film according to FIG. 12.

The layers 26a and 26b or the film sheets 8b or 48 are cut as a spiral sheet out of the film tube 52 according to FIG. 7 by means of a blade (not shown in the drawing) along the spiral line 53 so that then, according to FIG. 10, two spirally cut film sheets or layers 26a and 26b are obtained, which are permanently bonded to each other by means of the polyethylene melt 25 according to FIG. 10, whereby the two drawing orientation lines 41 and 42 run opposite to each other and consequently so does the orientation of the molecular chains of the layers 26a and 26b. The joining of the crosswise drawn spiral sheets or layers 26a and 26b also takes place for the bonding of the individual layers according to FIGS. 12 and 12a.

Figure 8:
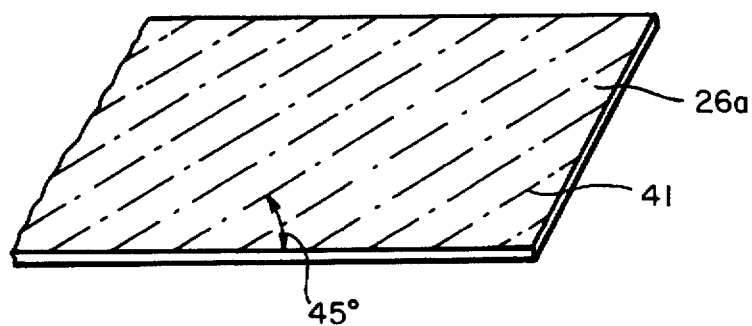
FIGS. 8 and 9 illustrate two differently drawn film sheets which have been cut out of the tubular film and which are laid one on top of the other so as to be rotated by 180° with respect to each other.
Figure 9:
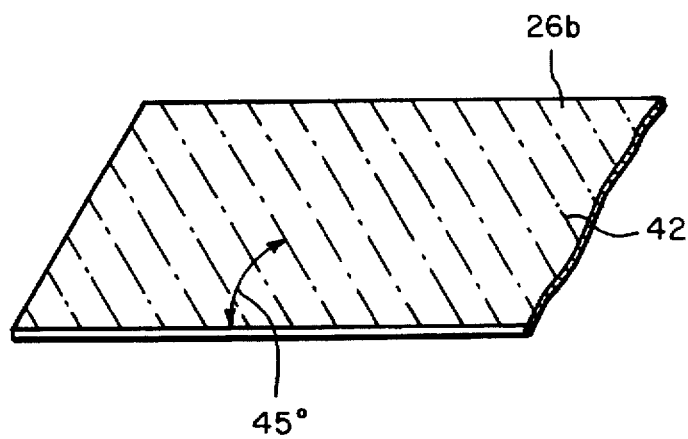

FIGS. 8 and 9 show two crosswise drawn layers 26a and 26b which are cut out of the film tube 52 and which, according to FIG. 10, are permanently bonded to each other by means of the polyethylene (PE) melt 25 as already explained.

FIG. 6 shows the production process of a composite film 48 which consists of the layers 26a of the polyethylene binder and layer 26b. The two film sheets 26a and 26b roll off a roller (not shown in the drawing) and move according to FIG. 6 as shown by the arrow 50, whereby they are guided over rollers 56 and 57 and then compacted by rollers 58 and 59, whereby the polyethylene binder 25 is also introduced, thus producing a permanent or else a floating bond between the two layers 26 (film sheet) and 26b (film sheet). In essence, layer 25 is a melt which acts with layers 26a and 26b via fusion when subjected to the roller pressure. The film or composite film designated with the numeral 48 in FIG. 6 corresponds to layer 8 in FIG. 2, which can likewise consist of two crosswise drawn laminates which are permanently bonded to each other by means of a polyethylene melt.

Figure 13:
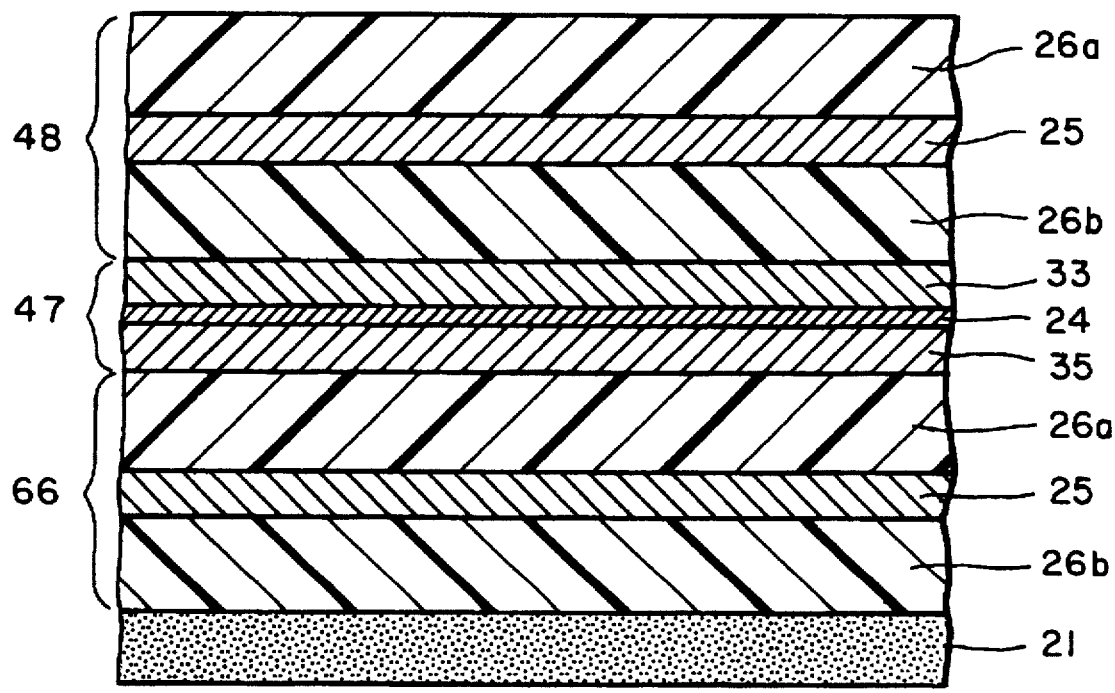
FIG. 13 is another section representation of a film sheet which comes from individual differently drawn layers or sheets and which are connected to each other by means of polyethylene binders, whereby at one place or between a certain layer, a metal foil has been inserted, whereas there is an adhesive on the surface of an outer layer, either over the entire surface or in strips.

FIG. 13 shows another composite film consisting of a total of 10 layers. The upper composite film 48 consists of the two layers 26a and 24b bonded by means of the polyethylene melt 25 and this is followed by another polyethylene melt 33 with a metal foil 24 which is, in turn, bonded to another composite film 66 by means or a polyethylene melt 35. The composite film 66 likewise consists of the two layers 26a and 26b which are bonded by means of the polyethylene melt 25. On the bottom or outer layer 26b, there is once again the adhesive 21 which is applied either over the entire surface of the underside of the layer 26b or else, according to FIG. 2, in strips arranged at a distance from each other. The adhesive 21 corresponds to the adhesive layer 5 in FIG. 2.

FIG. 12a shows once again a perspective representation of the composite film 32 from FIG. 2. The composite film 32 consists of an upper layer 32a which is not drawn and which is permanently bonded by means of a polyethylene melt 35 to the metal foil 34 which is permanently bonded by means of a polyethylene melt 35 to another layer 32b which is not drawn. The layers 32a and 32b correspond essentially to the layers according to FIG. 6 and 8. In FIGS. 1 and 2, on the underside of the layer 32b, there is an adhesive 31. which is applied either in strips or else over the entire surface on the underside of layer 32b. The adhesive can be left out.

Figure 11A:
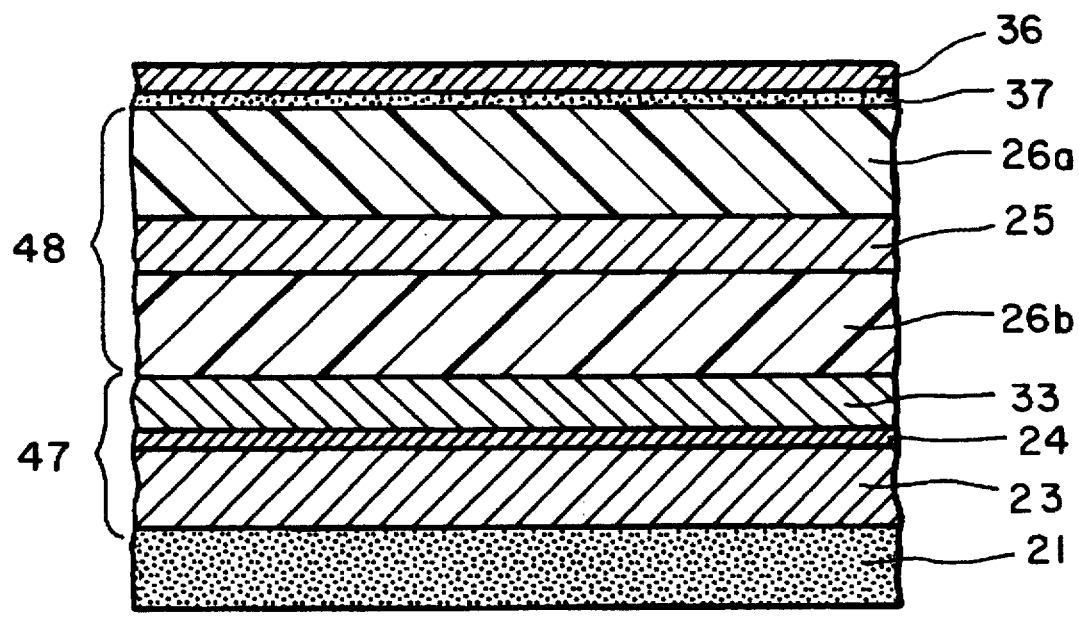
FIG. 11a is another section representation of a film sheet which comes from individual differently drawn layers or sheets and which are connected to each other by means of polyethylene binders, whereby at one place or between a certain layer, a metal foil has been inserted, whereas there is an adhesive on the surface of an outer layer, either over the entire surface or in strips.

FIG. 11a shows that one of the layers 26a is provided with a paper layer 36 which adheres to the layer 26a by means of an adhesive 37.

FIGS. 2a,b show a hollow rivet 17 made of metal with a tubular rivet shaft 30 and a rivet head 27. The lower end of the rivet shaft 30 is somewhat wavy, whereby the curves are characterized by the radius 29. The lower, outer edge forms a cutting edge 28 which, as already mentioned, has a wavy shape and, when the hollow rivet is inserted into the composite film—which can consist of three or ten layers—said cutting edge cuts through the films 6, 8 made of plastic, FIGS. 1 and 2, or 26a, 26b or 32, FIGS. 11 to 13, in such a way that the films are not pulled through downwards with the rivet, thereby covering the metal foil. Due to the cutting edge 28, the rivet can be punched through the plastic films in such a way that the layer 6, 8 remains unchanged in its position according to FIG. 2a, so that the hollow rivet can establish an electrical connection between the metal foil 7' and the electric cable 14. After the insertion procedure, the lower protruding end of the hollow rivet 17 is flanged and a sealing crown 22 is formed which, together with the rivet head 27, affixes the hollow rivet in the film 1.

What is claimed is:

1. A moldable film (1) having a longitudinal side or middle axis for shielding from radiation, flows and/or electric fields and/or for insulation or for galvanic separation of electrically conducting or conductive parts and/or for fastening parts, especially components, pipes or electric line to a base, said moldable film comprising: a metal first layer (7') having a first side and a second side, a second layer (8, 26a, 32a) having a first side and a second side, said second side of said second layer being attached to said first side of said first layer, said second layer having been being drawn crosswise to the longitudinal side or middle axis of the film (1) and a third layer (6, 26b, 32b), which has a first side and a second side, said first side of said third layer being bonded to the second layer or said metal first layer, said third layer having been drawn in a direction parallel to the longitudinal middle axis of the film (1), which is different from the direction which said second layer had been drawn, in such a way that both the drawing orientation lines (41, 42) or the resulting oriented molecular structure of the layers intersect at an angle and that the second side of said third layer is provided with an adhesive (21, 31, 5), said adhesive being applied as a continuous coating or in strips.

2. The moldable film (1) according to claim 1, wherein the second layer (8, 26a), which is drawn in a direction crosswise to the longitudinal side of the film (1), is bonded by means of a polyethylene melt (25) to said third layer (26b), said third layer being drawn in the opposite direction from said second layer (26a).

3. The moldable film (1) according to claim 1, wherein the metal first layer is positioned between two layers (32a, 32b) which are drawn in opposite directions, and wherein said metal first layer (34) is bonded on both its first side and its second side by means of the polyethylene melt (35) to the drawn layers, and wherein one of the drawn layers (32b) has the adhesive (31) on one of its sides.

4. The moldable film (1) according to claim 1, wherein said third layer (26b) is directly or indirectly bonded by means of a polyethylene melt (33) to said metal first layer on whose underside a second polyethylene melt (23) is applied, said second polyethylene melt having adhesive (5) applied over either its entire surface or in strips.

5. A moldable film (1) having a longitudinal side or middle axis for shielding from radiation, flows and/or electric fields and/or for insulation or for galvanic separation of electrically conducting or conductive pans and/or for fastening pans, especially components, pipes or electric line to a base, said moldable film comprising: a metal first layer (24) having a first side and a second side, a second layer (26a) having a first side and a second side, a third layer (26b) having a first side and a second side and an adhesive layer (21), said first side of said metal first layer (24) being positioned next to and bonded to the second side of said third layer (26b) by means of a polyethylene melt (35) and the first side of said third layer (26b) being positioned next to and bonded to the second side of the second layer by means of a polyethylene melt, said second layer and said third layer being drawn in opposite directions and said adhesive layer being positioned on said second side of said metal first layer.

6. A moldable film (1) for shielding from radiation, flows and/or electric fields and/or for insulation or for galvanic separation of electrically conducting or conductive parts and/or for fastening parts, especially components, pipes or electric lines to a base, said moldable film comprising: a metal first layer (7') having a first side and a second side, a second layer (8, 26a, 32a) having a first side and a second side, and a third layer (6, 26b, 32b) having a first side and a second side, said first side of said second layer being attached to said second side of said first layer, said second side of said second layer being bonded to said first side of said third layer (6, 26b, 32b), and wherein the second side of the third layer is provided with an adhesive (21, 31, 5), said adhesive being applied as a continuous coating or in strips, and said third layer being indirectly bonded by means of a polyethylene melt (25) to said first metal layer (7').

7. The moldable film (1) according to claim 5, wherein a hollow rivet (17) made of metal can be inserted into the film (5, 6, 7'), and wherein said metal rivet (17) connects the metal first layer with an electric line (14).

* * * * *